United States Patent
Schwartz et al.

(10) Patent No.: US 6,995,339 B2
(45) Date of Patent: Feb. 7, 2006

(54) HEATABLE WIPER REST AREA FOR A TRANSPARENCY

(75) Inventors: James H. Schwartz, Gibsonia, PA (US); Allen R. Hawk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/662,733

(22) Filed: Sep. 15, 2003

(65) Prior Publication Data

US 2004/0084432 A1 May 6, 2004

Related U.S. Application Data

(60) Provisional application No. 60/411,677, filed on Sep. 18, 2002.

(51) Int. Cl.
*B60L 1/02* (2006.01)

(52) U.S. Cl. .................. 219/202; 219/203; 219/522; 219/541; 219/543; 428/38; 428/46

(58) Field of Classification Search .............. 219/202, 219/203, 522, 530, 541, 543; 428/38, 46
See application file for complete search history.

(56) References Cited

U.S. PATENT DOCUMENTS

| | | | |
|---|---|---|---|
| 3,772,075 A * | 11/1973 | Tamopol et al. ........... 427/98 |
| 4,109,133 A | 8/1978 | Hänle et al. .............. 219/203 |
| 4,368,087 A | 1/1983 | Valimont et al. .......... 156/102 |
| 4,373,130 A | 2/1983 | Krasborn et al. ......... 219/203 |
| 4,513,196 A | 4/1985 | Bartelsen et al. ........ 219/203 |
| 4,554,713 A | 11/1985 | Chabal ...................... 26/51 |
| 4,643,944 A | 2/1987 | Agethen et al. .......... 428/349 |
| 4,725,710 A * | 2/1988 | Ramus et al. ............. 219/203 |
| 4,786,784 A * | 11/1988 | Nikodem et al. .......... 219/543 |
| 4,792,536 A | 12/1988 | Pecoraro et al. ............ 501/70 |
| 4,898,789 A | 2/1990 | Finley ....................... 428/623 |
| 4,910,380 A | 3/1990 | Reiss et al. ................ 219/203 |
| 4,918,288 A * | 4/1990 | Carter et al. .............. 219/203 |
| 4,971,848 A | 11/1990 | Ruelle et al. ............... 428/38 |
| 4,988,398 A | 1/1991 | Pereman et al. ............ 156/64 |

(Continued)

FOREIGN PATENT DOCUMENTS

DE    101 60 806    6/2003

(Continued)

OTHER PUBLICATIONS

International Search Report dated Feb. 2, 2004.

(Continued)

*Primary Examiner*—Robin O. Evans
*Assistant Examiner*—Leonid Fastovsky
(74) *Attorney, Agent, or Firm*—Andrew C. Siminerio

(57) ABSTRACT

An automotive transparency having a heatable wiper rest area includes a first glass sheet and a second glass sheet secured together by an interlayer material. An opaque band is positioned on the inner surface of the outer glass sheet along a portion of an edge of the outer sheet at an expected wiper rest areas; and an electrically conductive member is positioned on a major surface of the second glass sheet and extends along an edge portion of the second sheet at the wiper rest area. A plurality of bus bars positioned in electrical contact along the conductive member divides the conductive member into a plurality of heatable areas with a first lead electrically interconnecting selected ones of the bus bars and a second lead electrically interconnecting other selected ones of the bus bars with overlying portions of the first and second leads electrically isolated from each other.

29 Claims, 2 Drawing Sheets

U.S. PATENT DOCUMENTS

| | | | |
|---|---|---|---|
| 5,028,759 A | 7/1991 | Finley | 219/203 |
| 5,059,295 A | 10/1991 | Finley | 204/192.27 |
| 5,071,796 A | 12/1991 | Jones et al. | 501/70 |
| 5,099,104 A * | 3/1992 | Holzer et al. | 219/203 |
| 5,122,403 A * | 6/1992 | Roginski et al. | 428/38 |
| 5,208,444 A | 5/1993 | Wintr et al. | 219/547 |
| 5,213,828 A * | 5/1993 | Winter et al. | 428/46 |
| 5,240,886 A | 8/1993 | Gulotta et al. | 501/70 |
| 5,434,384 A | 7/1995 | Koontz | 214/203 |
| 5,451,280 A | 9/1995 | Gillner | 156/106 |
| 5,593,929 A | 1/1997 | Krumwiede et al. | 501/70 |
| 5,812,332 A | 9/1998 | Freeman | 359/894 |
| 5,824,993 A * | 10/1998 | Chrysochoos et al. | 219/203 |
| 5,877,473 A * | 3/1999 | Koontz | 219/203 |
| 5,886,321 A * | 3/1999 | Pinchok et al. | 219/203 |
| 6,163,013 A | 12/2000 | King et al. | 219/203 |

FOREIGN PATENT DOCUMENTS

| | | |
|---|---|---|
| EP | 0741502 | 11/1996 |
| EP | 0788295 | 8/1997 |
| EP | 0800333 | 10/1997 |
| EP | 0 625 422 | 11/1998 |
| IT | 1244185 | 12/1990 |

OTHER PUBLICATIONS

U.S. Appl. No. 60/411,677, filed Sep. 18, 2002.

* cited by examiner

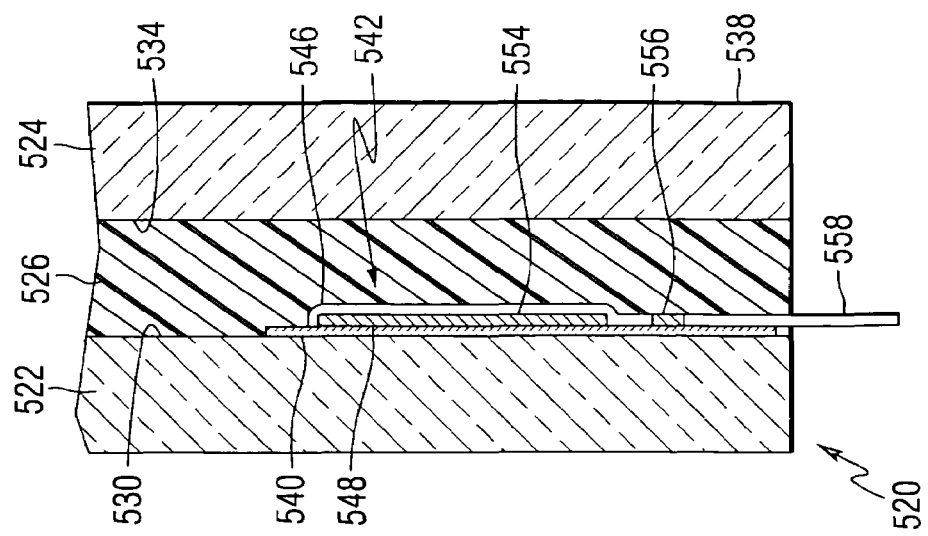
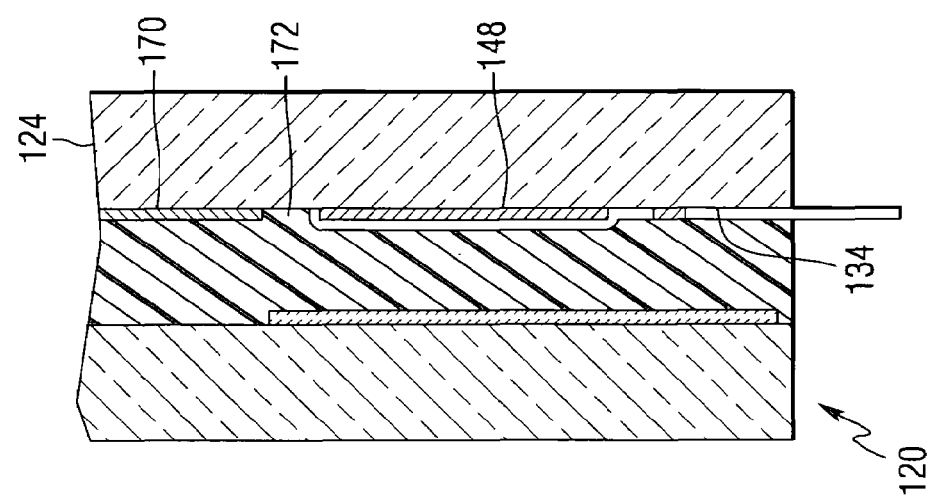
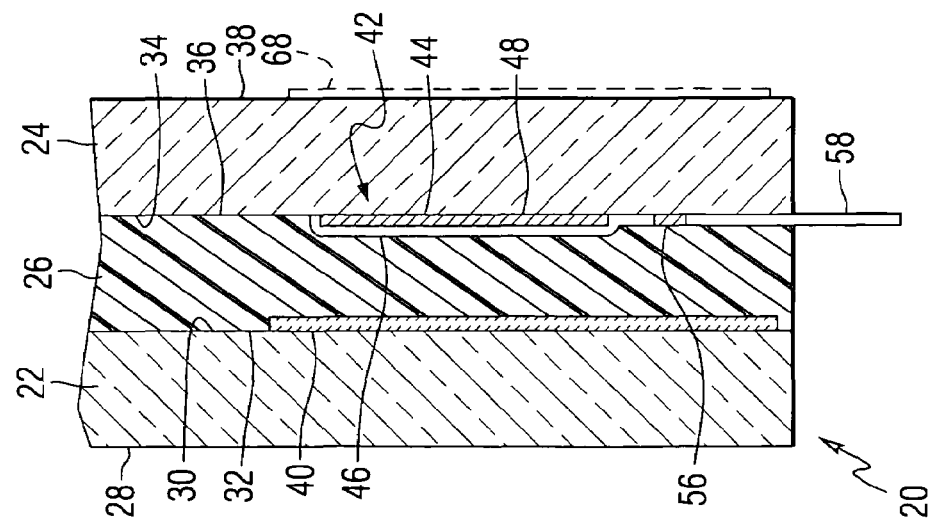

HEATABLE WIPER REST AREA FOR A TRANSPARENCY

CROSS REFERENCE TO RELATED APPLICATIONS

This application claims the benefits of U.S, Provisional Application Ser. No. 60/411,677 filed Sep. 18, 2002, which application is herein incorporated by reference in its entirety.

FIELD OF THE INVENTION

This invention relates to heatable wiper rest area for a transparency and method of fabricating a transparency having a heatable wiper rest area, and in particular to a vehicle windshield having a heatable wiper rest area that is hidden from view from the exterior of a vehicle.

DISCUSSION OF THE PROBLEM AND AVAILABLE TECHNOLOGY

In general, wipers are used to remove excess water from transparencies such as automotive windshields and rear windows. It is known that extreme cold hardens the material of the wipers and/or freezes moisture on the surface of the transparency resulting in the wiper sticking to the windshield and/or window. At the present time, there are available automotive windshields and rear windows having facilities to heat the rest area or rest position of the wiper to soften the material of the wiper and/or to melt frozen moisture between the wiper and the windshield and/or rear window so that the wiper is free to move when the wiper motor is energized.

U.S. Pat. No. 4,109,133 teaches a rear window for an automobile having at an upper portion thereof resistance-heating wires for electrically heating the window. A window wiper is provided to sweep the window. In the wiper rest area or position, the window is provided with a heating wire to heat the rest area to free the wiper when frozen to the window. The width of the heated area in contact with the wiper is increased by providing the heating wire with sinusoidal undulations. U.S. Pat. No. 4,513,196 teaches a heatable windshield having two zones each having a plurality of spaced wires; one zone for rapid heating, the other for slow heating. The wires of each zone are sized to provide each zone with the different heating rate.

U.S. Pat. No. 4,971,848 discloses a heatable windshield having a plurality of fine conductive wires in the vision area and an increase in the number of wires in the lower portion to heat the wiper rest area or wiper rest position. The conductive wires are provided by depositing electrically conductive enamel on the glass and heating the enamel to melt the enamel and bond it to the glass. Patentschrift 150 979 discloses a rear window heating system that also includes a plurality of spaced conductors in the vision area of the window and reduction in the space between the conductors in the end-of-travel position of the wiper blade. The spaced conductors are applied by screen printing a conductive heat setting material and thereafter firing the material to set it to the glass.

U.S. Pat. No. 4,373,130 also discloses a windshield having a heatable wiper rest area. The heatable area includes an electric heating resistance member between the inner and outer glass panes of the windshield or on outer surface of the inner pane of a laminated windshield. An opaque layer is disposed either on the inner or outer surface of the outer pane. When the resistance member is mounted on the outer surface of the inner ply, it is positioned between an opaque member that is heat conductive and a member close to the outer surface of the inner pane that is less heat conductive than the opaque member. The heating member can be a plurality of conductors or a continuous metal or semiconductor layer.

European Patent Application 0 625 422 A1 discloses a heatable windshield having a plurality of closely spaced conductive strips on an enamel layer on the inside surface of the outer pane to heat the windshield wiper area. The strips are applied by screen printing silver on the decorative edge and thereafter heating the silver to set the strips. U.S. Pat. No. 5,434,384 discloses a heatable windshield having a heatable member, e.g. an electroconductive coating, and bus bars spaced from one another at the lower portion of the windshield to heat the wiper rest area.

U.S. Pat. No. 4,910,380 discloses a motor vehicle window having a glass pane having an outer edge and a peripheral black obscuration band extending around the pane edge. The band is formed of a coating-deposited black conductor capable of generating heat when an electric current is passed through it. The black conductor made of frit that is silk screened onto the glass and fired to set the conductor to the glass can be mounted on a black non-conductive member or within a spaced non-conductive member. The black conductive member can be used to heat the wiper rest position on the window.

U.S. Pat. No. 5,877,473 discloses a heatable member for a heated wiper rest area, wherein the member is an electrically conductive coating divided into multiple discrete heating areas.

SUMMARY OF THE INVENTION

The present invention provides a transparency having a heatable wiper rest area comprising: a rigid transparent sheet having major surface; an opaque band positioned on the major surface of the sheet along at least a portion of a selected edge of the sheet at an expected wiper rest area; and a wiper rest area heating arrangement. The wiper rest area comprises: an electrically conductive member positioned on the opaque band on the sheet extending along at least a portion of the selected edge of the sheet at the expected wiper rest area; a plurality of bus bars positioned in electrical contact along the conductive member, wherein the plurality of bus bars divides the electrically conductive member into a plurality of adjacent discrete heatable areas; a first lead to electrically interconnect selected ones of the bus bars, the first lead extending on the band along an edge of the coating; a second lead to electrically interconnect other selected ones of the bus bars, the second lead extending on the band along the edge of the coating, such that moving current through the first and second leads and bus bars moves current across the discrete areas to heat the discrete areas, wherein a portion of the first lead and a portion of the second lead overlay each other; and an insulating member positioned between the portion of the first lead and the portion of the second lead to electrically insulate the first lead from the second lead. In one nonlimiting embodiment of the invention, the sheet is a glass sheet, the conductive member is an electrically conductive coating, the first and second leads extend between the lower edge of the conductive member the a lower edge of the sheet, and the transparency of is a automotive backlight.

The present invention also provided a transparency having a heatable wiper rest area comprising: a first glass sheet having an outer major surface and an inner major surface;

and second glass sheet having an outer major surface and an inner major surface, whrein the inner major surface of the first glass sheet faces the inner major surface of the outer glass sheet; an interlayer material securin gthe inner major surface of the first glass sheet to the inner major surface of the second glass sheet; an opaque band positioned on the inner major surface of the outer glass sheet along at least a portion of a selected edge of the outer glass sheet at an expected wiper est area; and a wiper rest area heating arrangement. The heating arrangement. The heating arrangement comprises: an electrically conductive member positioned on either the inner major surface or the outer major surface of the second glass sheet extending along at least a portion of the selected edge of the second glass sheet at the expected wiper rest area; a plurality of bus bars positioned in electrical contact along the conductive member, wherein the plurality of bus bars divides the conductive member into a plurality of adjacent discrete heatable areas; a first lead to electrically interconnect selected ones of the bus bars, the first lead extending along an edge of the conductive member; a second lead to electrically interconnect other selected ones of the bus bars, the second lead extending along the edge of the conductive member, wherein a portion of the first lead and aportion of the second lead overlay each other; and an insulating member positioned between the portion of the first lead and the portion of the second lead to electrically insulate the first lead from the second lead. In one nonlimiting embodiment of the invention, the first and second leads extend between the edge of the conductive member and the lower edge of the second glass sheet, the conductive member is an electrically conductive coating that extends along the inner major surface of the second glass sheet, and the transparency is a windshield.

The present invention further provides a method of making a transparency having a heatable wiper rest area comprising: providing a rigid transparent sheet having major surface; applying an opaque band positioned on the major surface of the sheet along at least a portion of a selected edge of the sheet at an expected wiper rest area; applying an electrically conductive member positioned on the opaque band along at least a portion of the selected edge of the sheet at the expected wiper rest area; positioning a plurality of bus bars in electrical contact along the conductive member, wherein the plurality of bus bars divides the electrically conductive member into a plurality of adjacent discrete heatable areas; positioning a first lead on the band and along an edge of the coating to electrically interconnect selected ones of the bus bars; positioning a second lead along the band and along the edge of the coating to electrically interconnect other selected ones of the bus bars, such that moving current through the first and second leads and bus bars moves current across the discrete areas to heat the discrete areas, wherein a portion of the first lead and a portion of the second lead overlay each other; and the portion of the first lead is electrically insulated from the portion of the second lead.

BRIEF DESCRIPTION OF THE DRAWING

FIG. 3 is a sectional view along line 3—3 of FIG. 1.

FIGS. 4 and 5 are views similar to FIG. 3 of alternate embodiments of the present invention.

DESCRIPTION OF THE INVENTION

Figure 1:
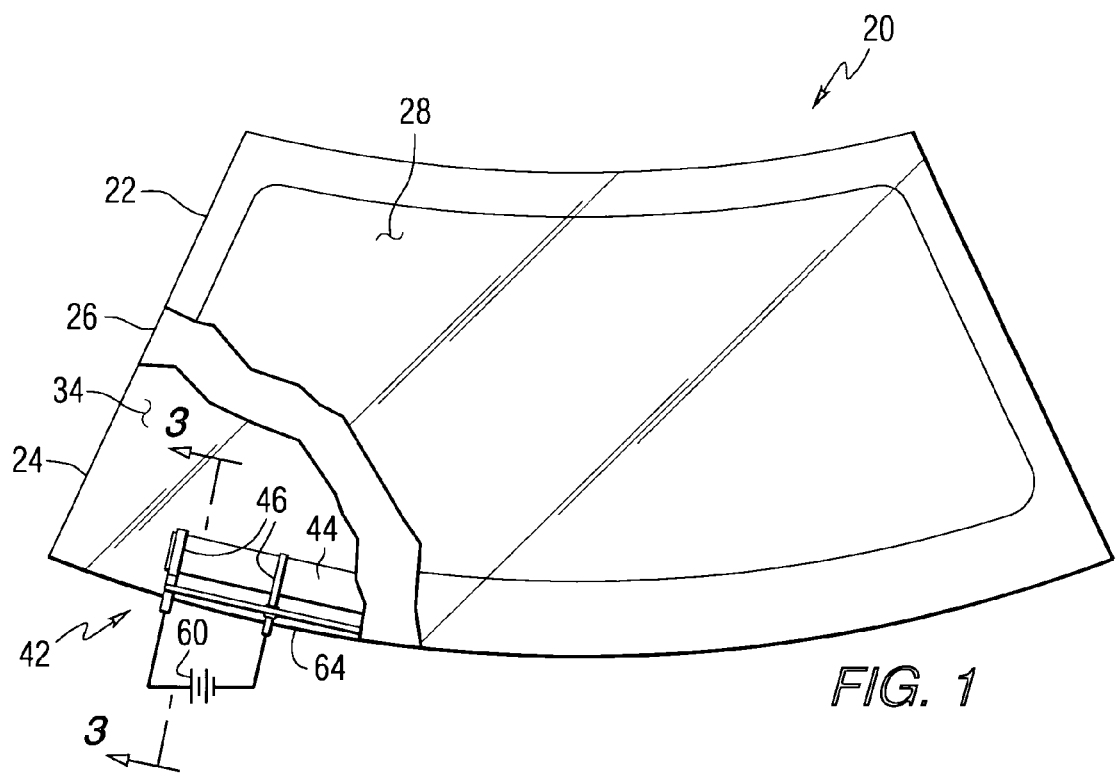
FIG. 1 is a plan, cutaway view of a windshield having a heatable wiper rest area incorporating features of the present invention, with portions removed for clarity.

The instant invention will be discussed for use with an automotive windshield; however, as will be appreciated, the invention is not limited thereto and can be used with any window or transparency for any type of air, space, water and/or land vehicle and/or windows for any type of building. Further, in the following discussion of the invention, the automotive windshield has a laminated structure including two pieces of glass joined together by an interlayer material. As will be appreciated, the invention is not limited thereto and can be used on automotive windshields of the type having a single piece of glass and a plastic layer on a surface of the glass, e.g. of the type disclosed in U.S. Pat. No. 4,643,944 which teachings are hereby incorporated by reference. Further, the invention can be used with transparencies made of any material e.g. but not limiting to the invention, glass, glass-ceramic and/or plastic.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.2, or 2.5 to 8.7 or 5.5 to 10. Additionally, any reference referred to as being "incorporated herein" is to be understood as being incorporated in its entirety.

Figure 2:
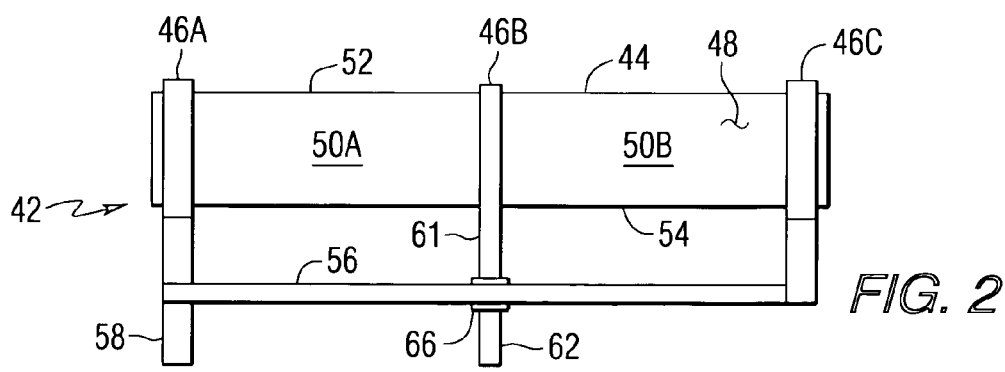
FIG. 2 is an enlarged plan view of the heatable wiper rest area of FIG. 1, with portions removed for clarity.

In the following discussion, like numerals refer to like elements unless otherwise indicated. With reference to FIGS. 1, 2 and 3, there is shown a windshield 20 incorporating features of the invention. The windshield 20 includes an outer glass sheet 22 and an inner glass sheet 24 joined by an interlayer 26, e.g. a sheet of polyvinylbutyral. The outer glass sheet 22 has an outer surface 28 over which wipers are moved in any convenient manner to remove excess moisture, e.g. water, snow, dew and/or ice. The outer glass sheet 22 has an inner surface 30 secured to surface 32 of the interlayer 26, with inner surface 34 of the inner glass sheet 24 secured to surface 36 of the interlayer 26. The surfaces 30 and 34 of the outer sheet 22 and inner sheet 24, respectively, are joined to the surfaces 32 and 36 of the interlayer 26, respectively, in any convenient manner, such as but not limited to the manners disclosed in U.S. Pat. Nos. 4,368,087 and 4,988,398, which teachings are hereby incorporated by reference. Outer surface 38 of the inner sheet 24 faces the interior of the automobile.

As can be appreciated by those skilled in the art, the invention can be practiced with glass of any composition. For example but not limiting to the invention, glasses having the compositions disclosed in U.S. Pat. Nos. 4,792,536; 5,071,796; 5,240,886 and 5,593,929, which disclosures are hereby incorporated by reference, can be used in the practice of the invention.

The interlayer 26 can be any of the types known in the art of laminating glass sheets, e.g. the interlayer 26 can have a uniform thickness throughout its extent or can have a taper in at least a portion of the interlayer as it extends between the top and bottom edges of the laminate as disclosed in U.S. Pat. No. 5,812,332. Further, the windshield can include a shade band, e.g. as disclosed in U.S. Pat. No. 4,554,713. The disclosures of U.S. Pat. Nos. 4,554,713 and 5,812,332 are hereby incorporated by reference.

An opaque decorative band 40 of the type used in the art is provided on marginal edge portions of surface 30 of the outer sheet 22. Although not limiting to the present invention, the opaque band 40 is a black ceramic paste screen printed onto the marginal edges of the inner surface 30 of the outer sheet 22. The glass and band are heated to melt the paste and bond the band to the glass surface (also referred to as "firing" the band) either prior to or during the thermal shaping of the glass sheets. The band 40 hides the components forming the heatable wiper rest area when viewing the windshield 20 from the outside of the vehicle, i.e. through the outer sheet 22, as will be discussed later in more detail. The band 40 also hides adhesive used to secure the windshield to the automobile body opening while preventing degradation of the adhesive by solar energy.

As can be appreciated, under certain conditions, when the wiper motor is deenergized, the wipers stop in the vision line of the driver. In the discussion of the invention, such a position is not the rest position. Further as will be appreciated, the specific area of the wiper rest position is not limiting to the invention e.g. the wiper rest area can be at the top of the windshield or along a side of the windshield as mounted in the automobile.

With continued reference to FIGS. 1–3, the windshield 20 further includes a wiper rest area heating arrangement 42 having a heatable element 44 and a plurality of bus bars 46. In this nonlimiting embodiment of the invention, arrangement 42 is positioned along surface 34 of inner sheet 24. It should be appreciated that the heating arrangement 42 does not need to extend along the entire lower portion of the windshield 20. Rather, it only needs to extend along at least a portion of a selected edge of the windshield at the expected rest position of the wiper(s). Although not limiting in the present invention, in one particular embodiment, the heatable element 44 is an electrically conductive coating 48 applied to surface 34 of sheet 24 and divided into a plurality of adjacent discrete heatable coating areas by a plurality of bus bars in electrical contact with the coating. For example and without limiting the present invention, referring to FIG. 2, coating 48 is divided into adjacent discrete heatable areas 50A and 50B by bus bars 46A, 46B and 46C. Although not required, in one nonlimiting embodiment of the invention, the bus bars 46 extend at least to edges 52 and 54 of the coating 48 and in one embodiment, beyond the edges of coating 48. It is believed that such a bus bar configuration can reduce the occurrence of hot spots in the coating 48 when power is applied to it through the bus bars. The bus bars 46A and 46C are interconnected by lead 56, which includes a connector 58, to a power source 60, e.g. the negative output of the car battery, and bus bar 46B is connected by a lead 61, which includes a connector 62, to the power source 60, e.g. the positive output of the car battery. Connectors 58 and 62 can be either integral with the leads 56 or 61, respectively, or can be separate members that electrically interconnect with their respective leads. Leads 56 and 61 extend along an edge of the coating with at least a portion of the leads extending along the same edge of the coating. Although not required, in one nonlimiting embodiment, the leads extend along lower edge 54 and between lower edge 54 of coating 48 and lower edge 64 of sheet 24 of windshield 20 so that the ceramic band 40 does not have to extend beyond the wiper heating area towards the central viewing area of the windshield. In addition, by positioning the leads along lower edge 64, it is more difficult to see the leads from the inside of the vehicle once the windshield 20 is installed in a vehicle. Furthermore since the leads both extend along the same side of the coating, the width of the ceramic band 40 required to hide the heating arrangement 42, i.e. heatable element 44, bus bars 46, leads 56 and 61 and portions of connectors 58 and 62 can be minimized.

With leads 56 and 61 both extending along the same edge of the heating element 44, for example between edge 54 of coating 48 and edge 64 of sheet 24, the leads must overlay, i.e. cross at some point, in order for the connectors 58 and 62 to provide external electrical access to the leads. For example, referring to FIG. 2, lead 56, which delivers power to bus bar 46C from connector 58, crosses lead 61, which delivers power to bus bar 46B from connector 62, at intersection point 66. In order to prevent electrical shorting of the heating arrangement 42, the leads are electrically insulated from each other, at least in the area where they cross. In one nonlimiting embodiment of the invention, this insulation is provided by positioned a piece of KAPTON® polyamide, commercially available from DuPont Chemical Company, at least between the overlaying portions of the respective bus bars and/or leads.

Dividing the heatable element 44 into smaller discrete heatable areas as compared to having a single heatable element 44 powered by a single pair of bus bars positioned along its edges provides for additional flexibility in designing the heating arrangement 42. For example, reducing the area of each discrete area will increase the power density in the area, or for a desired power density, a smaller area will allow the use of a heating element having a lower electrical resistance. As can be appreciated, the invention is not limited to the number of discrete heatable areas. Further, in instances where the windshield is a coated windshield of the type known in the art having a conductive coating applied to the central viewing portion of the windshield, the coating 48 can be isolated from other portions of the windshield coating, as will be discussed later in more detail. For example, FIG. 4 illustrates a nonlimiting embodiment of the invention similar to the embodiment shown in FIG. 3, wherein windshield 120 includes an electrically conductive coating 148 positioned along inner surface 134 of inner sheet 124, e.g. along a lower portion of sheet 124, and functioning as a wiper area heating element, and an additional coating 170 positioned along inner surface 134 of inner sheet 124, e.g. along an upper central portion of sheet 124. Coatings 148 and 170 are electrically insulated from each other to prevent the power being supplied to the lower coating 148 from leaking into the upper coating 170 and thus diverting power from the wiper heating arrangement.

In instances where coatings 148 and 170 are applied at the same time, this electrical insulation can be accomplished by providing a deletion area 172 between the two coatings. For example and without limiting the present invention, the coatings can be applied to the glass sheet and subsequently a portion of the coating can be removed to electrically isolate one coating from the other. For example and without limiting the present invention, it has been found that scoring the coating, e.g. with a thin rotary cutting wheel, a diamond stylus, or nonrotating blade, such as a razor blade, is sufficient to provide the required electrical separation. In another nonlimiting embodiment, the deletion area 172 can be formed by abrading the coating in the desired area, e.g. using an abrasive wheel. In one nonlimiting embodiment of the invention, the deletion line was formed using an 80 grit polyurethane and aluminum silicate wheel. To provide the desired pattern, the scoring or abrading tool can be positioned on a numerically controlled device that is programmed to provide the desired pattern. As another nonlimiting alternative, a mask can be applied to the sheet prior to coating to prevent the coating operation from depositing the coating on the surface of the sheet at the desired deletion area.

The discussion will now be directed to the electrical heating properties of the electrically heatable element of the instant invention. In the practice of the invention, the heatable element provides a power density ranging from 0.05 to 2.0 watts/sq. inch, e.g. 0.4 to 1.0 watts/sq. inch, or 0.5–0.9 watts/sq. inch. In one nonlimiting embodiment of the present invention, the heatable element provides a power density of 0.75 watts/sq. inch. It should be appreciated that lower densities can be used; however, at lower power densities a longer time period is required to melt ice or free the wiper frozen to the windshield. Conversely, at higher power densities, the time period decreases; however, excessive heat can cause delamination of the laminated windshield or edge stresses in the glass sheets.

In the practice of the invention, the selection of the electrically heatable element can be determined using the following equations, which determination is not limiting to the invention:

$$S = P/A \qquad \text{Equation (1)}$$

where: S is power density of the heatable member in watts/sq. inch,
P is power of the heatable member in watts, and
A is area member of the heatable member in sq. inches.

$$P = VI \qquad \text{Equation (2)}$$

where: P is as previously defined;
V is the voltage of the power supply, which for an automobile is a 12 volt car battery, and
I is the current flow through the heatable member in amperes.

$$V = IR \qquad \text{Equation (3)}$$

where: V and I are as previously defined, and
R is the resistance of the heatable member in ohms.

Equations (1), (2) and (3) are combined to provide following Equation (4).

$$S(=P/A=VI/A)=V^2/AR \qquad \text{Equation (4)}$$

where S, P, A, V, I and R are as previously defined.
Solving Equation (4) for R, Equation (4) becomes:

$$R = V^2/AS \qquad \text{Equation (5)}$$

where R, V, A and S are as previously defined.

Using these equations, the heatable element can be configured based on specified required design parameters.

Equations (1), (2), (3), (4) and (5) are equations known to those skilled in the art of electric circuits.

In the embodiment of the present invention illustrated in FIGS. 1–3, the heatable element 44 is positioned along the inner surface 34 of the inner glass sheet 24. However, it is contemplated that the heating element can be positioned at other locations of the windshield. For example and without limiting the present invention, FIG. 5 illustrates a windshield 520 having an outer glass sheet 522, an inner glass sheet 524 and an interlayer 526. An opaque ceramic band 540 is positioned along at least the lower marginal edge of inner surface 530 of outer sheet 522. Wiper heating arrangement 542 is positioned on and behind band 540 so that heatable element 544, and in particular electrically conductive coating 548, bus bars 546 (only one shown), lead 556 and a portion of connector 558, as well as the other leads and other connectors (not shown) are not visible when viewing the vehicle from the outside, i.e. through the windshield 520.

It is further contemplated that the wiper heating assembly can be incorporated into transparencies other than a laminate or a windshield. For example, referring to the nonlimiting embodiment of the invention illustrated in FIG. 5, if glass ply 524 and interlayer 526 are removed from windshield 520, the remaining structure would be a single rigid sheet 522, e.g. a glass sheet, having a wiper heating assembly 542 positioned on an opaque ceramic band 540. As discussed earlier, the wiper heating assembly can be positioned along any edge of the sheet 522, for example but not limiting in the present invention, along at least the lower marginal edge of inner surface 530 of sheet 522. With the wiper heating arrangement 542 being positioned on and behind band 540, heatable element 544, and in particular electrically conductive coating 548, bus bars 546 and lead 556 and a portion of connector 558 are not visible when viewing the vehicle from the outside, i.e. through sheet 522. In one nonlimiting embodiment of the invention, this single ply arrangement can be the back window (also referred to as a backlight) of a vehicle.

The material of the heatable element 44 is not limiting in the invention and can be made of any electrical conductive material, e.g. but not limited to aluminum, gold, silver, nickel, zinc, platinum, tungsten, stainless steel and alloys thereof to name a few. In addition, the heatable element 44 can be a non-conductive film, e.g. an organic adhesive, having conductive particles, e.g. but not limited to particles of aluminum, gold, silver, nickel, zinc, platinum, tungsten, stainless steel and alloys thereof to name a few, dispersed therein. Such a heatable element 44 can be applied to the appropriate surface of sheet 22 or 24 in any manner, e.g. sputter coating, spraying, electron deposition, electroless deposition, dip coating, painting to name a few.

Without limiting the present invention, the heatable element 44 shown in FIGS. 1–3 can be a solar radiation reflecting coating of the types disclosed in U.S. Pat. Nos. 5,028,759 and 5,059,295 or solar radiation reflecting, heatable coating e.g. of the types disclosed in U.S. Pat. Nos. 4,898,789 and 5,208,444. The disclosures of U.S. Pat. Nos. 4,898,789; 5,028,759; 5,059,295 and 5,208,444 are hereby incorporated by reference. For example, in one nonlimiting embodiment of the invention, the coating can be similar to the coating disclosed in U.S. Pat. No. 4,898,789 and include (in succession), starting at the glass surface, a 300 Angstrom film of zinc stannate, a 100 Angstrom film of silver, a 15 Angstrom film of titanium, a 600 Angstrom film of zinc stannate, a 100 Angstrom film of silver, a 15 Angstrom film of titanium, a 300 Angstrom film of zinc stannate and a 20

Angstrom film of titanium. Depending on the actual thickness of the films, the resistivity of the coating can vary from 2.0 to 3.5 ohms per square Referring back to Equation 5 discussed earlier, the wiper rest area heating arrangement 42 can be designed to accommodate specific design criteria. For example, for a vehicle having a 12 volt power source (V=12), and a 3 inch wide heatable wiper area formed from an electrically conductive coating having a resistance of 2.6 ohms per square (R=2.6), in order to generate a desired power density of 0.75 watts per square inch (S=0.75), substituting these values into Equation (5) indicates that the length of the coating forming each discrete the heatable wiper rest area (i.e. the distance between adjacent bus bars 46) should be 24.6 inches. In another nonlimiting embodiment, wherein V=12, desired S=0.48, R=3.4 and the coating 48 has a width of 5 inches, the length of each discrete heatable wiper rest area should be 17.6 inches. It should be appreciated that other combinations of variables can be substituted into the equation to determine other design criteria for the discrete heatable areas.

In one nonlimiting embodiment, the heatable element 44 is made of a structurally stable material. For example and without limiting the invention, electrically conducting foils or cloths, e.g. foils or wires of stainless steel, aluminum, silver, zinc, platinum, gold, tungsten and alloys thereof to name a few, can be used. The use of foils and wire cloths, and in particular wire cloths, in the practice of the invention have the advantage of easily conforming to the contour of the glass sheets, providing a rough surface for the interlayer 26 to engage when the glass sheets and interlayer are laminated together and are structurally stable.

Heatable element 44 can also be an electrically conductive ceramic material, as is well known in the art, or conductive plastic, or any other electrically conductive material that can be incorporated into a laminate.

If desired but not required, a second ceramic band can be incorporated into the windshield to hide the components forming the wiper rest area heating arrangement when viewing the windshield from the inside of the vehicle, i.e. through the inner sheet. For example and without limiting the present invention, in the embodiment of the invention shown in FIG. 3, an opaque coating, e.g. a ceramic band 68, can be applied to the outer surface 38 of inner sheet 24, and in the embodiment of the invention shown in FIG. 5, an opaque band (not shown) can be applied to surfaces 534 or 538 of inner sheet 524. It is further contemplated that in the embodiment of the invention wherein the second opaque coating is on the inner surface of the inner sheet, the wiper rest area heating arrangement can be positioned on such opaque coating, between the opaque coating and the interlayer, in a manner similar to the way heating arrangement 542 is positioned on opaque band 540 in FIG. 5. The addition of an opaque band on the inner surface of the outer sheet will effective hide the heating arrangement components from view from both inside and outside the vehicle.

Figure 6:
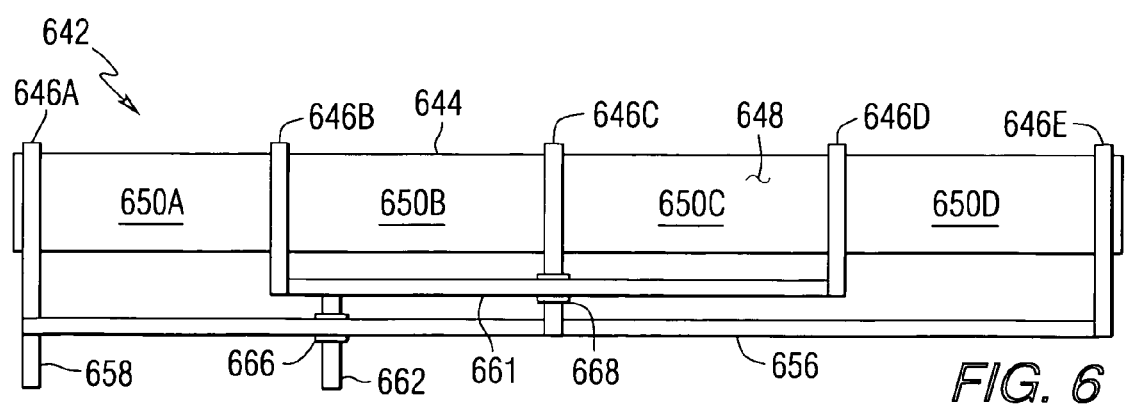
FIG. 6 is a view similar to FIG. 2 of an alternate embodiment of the present invention.

In the practice of the invention, two sheets of glass to be used in the fabrication of an automotive windshield were cut to shape. An opaque ceramic paste band was applied to the inner surface of the outer glass sheet about its marginal edge. The width of the band along the lower edge of the outer sheet was sufficient to hide the components of a wiper rest area heating arrangement. The glass sheet and paste were then heated to bond the band onto the glass. It should be appreciated that as an alternative, the paste could have been dried on the glass and subsequently fired onto the glass surface during the thermal bending of the glass sheets. A multilayered, silver containing electrically conductive coating of the type described earlier was applied to the entire inner surface of the inner sheet, with a mask being used to prevent the coating from extending to the peripheral edge of the inner glass sheet. The sheets were then combined, or booked, and bent using conventional windshield bending techniques. The bent sheets were then separated and a portion of the coating on the inner sheet was deleted to electrically isolate the lower coating forming the heating element of the wiper heating arrangement from the upper coating. This was done using a razor blade to score the coating. Five bus bars were used to divide the lower coating into four discrete wiper heating areas as shown in FIG. 6. More specifically, heating arrangement 642, which included a heatable element 644, and in particular an electrically conductive coating 648, was divided into four discrete heatable areas 650A, 650B, 650C and 650D by five bus bars 646A, 646B, 646C, 646D and 646E. The bus bars 646A, 646C and 646E were interconnected by lead 656 and connected by connector 658 to a power source (not shown in FIG. 6), and bus bars 646B and 646D were interconnected connected by lead 661 and connected by connector 662 to the power source. Lead 656 was electrically insulated from lead 661 or connector 662, and in particular at cross-over 666, and lead 661 was electrically insulated from bus bar 646C, and in particular at cross-over 668, to prevent electrical shorting of the heating arrangement. The bus bars and leads were formed from 0.003 inch thick copper foil. The interlayer was marked to show the position of the bus bars and leads relative to the interlayer when the sheets and interlayer was assembled. The bus bars and leads were secured to the interlayer at their marked positions by an adhesive (not shown) along one surface of the bus bars and leads. The portions of the leads that extended beyond the periphery of the windshield to provide external electrical access of the heatable element to the power source, e.g. a vehicle battery, were encapsulated in an electrically insulating material, e.g. KAPTON® polyamide, as disclosed in U.S. Ser. No. 10/201,863, filed Jul. 24, 2002, which is hereby incorporated by reference. The KAPTON® polyamide also served to seal the leads during lamination. KAPTON® polyamide was also used to electrically insulate the leads from each other, as discussed above, at locations where they crossed to prevent short circuiting of the wiper heating arrangement. The windshield was then assembled by positioning the interlayer sheet with the bus bars and leads over the inner surface of the inner sheet, and then positioning the outer sheet on the interlayer. The assembly was then laminated in any convenient manner to provide a windshield having a heatable wiper rest area. In the assembled windshield, the entire wiper heating arrangement was hidden from view from the outside of the vehicle.

As can be appreciated, the instant invention provides an economical manner to fabricate windshields having a heatable wiper area. In addition, the size of the heating element can be configured to take into account the available space for the element, the type of element and the power source. Furthermore, by positioning all the leads along the same edge of the coating, for example between the lower edge of the windshield and the lower edge of the coating, the width of the ceramic band required to cover the wiper rest are heating arrangement can be reduced and it is more difficult to see the arrangement from the inside of the vehicle once the windshield is installed.

As can now be appreciated, the invention is not limited to the above embodiments, which are present for illustration purposes only, and variations can be made without deviating from the scope of the invention.

What is claimed is:

1. A transparency having a heatable wiper rest area comprising:
   a rigid transparent sheet having a major surface and an area adjacent to a selected edge of the sheet designated as the heatable wiper rest area;
   an opaque band positioned on selected marginal edge portions of the major surface of the sheet along at least a portion of the selected edge of the sheet in a fixed relationship to the wiper rest area; and
   a heating arrangement for heating the wiper rest area, the arrangement comprising:
      an electrically conductive member positioned on the sheet in facing relationship to the opaque band, the conductive member having a first side and a second side with the first and second sides of the conductive member spaced from one another with the second side of the conductive member spaced a greater distance from the edge of the sheet than the first side of the conductive member, and the conductive member extending along at least a portion of the selected edge of the sheet in a fixed relationship to the wiper rest area;
      a plurality of bus bars positioned in electrical contact along the conductive member, wherein the plurality of bus bars comprises at least three bus bars defined as a first bus bar, a second bus bar and a third bus bar, with the second bus bar positioned between, and spaced from, the first and third bus bars so as to define a first discrete heatable area between and electrically connecting the first and second bus bars, and a second discrete heatable area between and electrically connecting the second and third bus bars;
      a first lead electrically interconnecting the first and third bus bars at a position adjacent one of the sides designated as the connected side, and spaced from the other side, of the conductive member, the first lead extending over the opaque band along the connected side of the conductive member;
      a second lead electrically connected to the second bus bar at a position adjacent the connected side, and spaced from the other side, of the conductive member, the second lead extending over the opaque band along the connected side of the conductive member, such that moving current through the first and second leads and the bus bars provides a current across the first discrete area and across the second discrete area to heat the wiper rest area, wherein a portion of the first lead and a portion of the second lead overlay each other; and
      an insulating member positioned between the portion of the first lead and the portion of the second lead that overlay each other to electrically insulate the portion of the first lead and the portion of the second lead that overlay each other.

2. The transparency according to claim 1, wherein the connected side of the conductive member is the first side of the conductive member and the first and second leads extend between the first side of the conductive member and the selected edge of the sheet.

3. The transparency according to claim 2, wherein the transparency is an automotive transparency and the selected edge of the sheet as mounted in a vehicle is a lower edge of the sheet.

4. The transparency according to claim 1, wherein the conductive member is an electrically conductive coating.

5. The transparency according to claim 4, wherein the coating is a multilayered, silver containing coating.

6. The transparency of claim 4, wherein the coating is a first electrically conductive coating and further comprising a second electrically conductive coating positioned along at least a central portion of the major surface of sheet and electrically isolated from the first coating.

7. The transparency according to claim 1, further comprising first and second connectors electrically connected to the first and second leads, respectively, to provide external electrical access to the leads, bus bars and conductive member.

8. The transparency according to claim 1, wherein the sheet is a glass sheet.

9. The transparency of claim 8, wherein the transparency is a automotive backlight.

10. The transparency according to claim 1, wherein the sheet is a first glass sheet, and further including a plastic interlayer and a second glass sheet wherein the interlayer secures the first and second glass sheets together with the conductive member between one of the sheets and the interlayer.

11. A transparency having a heatable wiper rest area comprising:
    a first glass sheet having an outer major surface and an inner major surface and an area of the outer surface of the first sheet adjacent to a selected edge of the first glass sheet designated as the heatable wiper rest area;
    a second glass sheet having an outer major surface, an inner major surface and a selected edge;
    an interlayer material securing the inner major surface of the first glass sheet to the inner major surface of the second glass sheet with the selected edge of the first sheet adjacent to the selected edge of the second glass sheet;
    an opaque band positioned on one of the major surfaces of the first glass sheet along at least a portion of the selected edge of the first glass sheet at the wiper rest area; and
    a heating arrangement for heating the wiper rest area, the arrangement comprising:
       an electrically conductive member positioned on either the inner major surface or the outer major surface of the second glass sheet, the conductive member having a first side and an opposite second side with the first side of the conductive member adjacent the selected edge of the second sheet and extending along at least a portion of the selected edge of the second glass sheet in a fixed relationship to the wiper rest area;
       a plurality of bus bars positioned in spaced relationship to one another along, and in electrical contact with, the conductive member, wherein the plurality of bus bars divides the conductive member into a plurality of adjacent discrete heatable areas;
       a first lead electrically interconnecting ones of the plurality of bus bars having two adjacent discrete heatable areas and one of the plurality of bus bars therebetween at a position adjacent the first side of the conductive member, the first lead extending along the first side of the conductive member;
       a second lead electrically interconnecting ones of the plurality of bus bars having two adjacent discrete heatable areas and one of the plurality of bus bars connected to the first lead therebetween, or to electrically connect one of the plurality of bus bars between a pair of adjacent ones of the plurality of bus bars connected to the first lead at a position adjacent the first side of the conductive member, the second lead extending along the first side of the conductive member, wherein a portion of the first lead and a portion of the second lead overlay each other; and an insulating member positioned between the portion of the first lead and the portion of the second lead that overlay each other to electrically insulate the portion of the first lead from the portion of the second lead that overlay each other.

12. The transparency according to claim 11, wherein the conductive member is on the inner surface of the second glass sheet and the first and second leads extend between the first side of the conductive member and the selected edge of the second glass sheet.

13. The transparency according to claim 12, wherein the first and second sheets secured together by the interlayer material is a laminate and the selected edge of the second glass sheet is a lower edge of the second glass sheet as the laminate is mounted.

14. The transparency according to claim 11, wherein the conductive member is an electrically conductive coating.

15. The transparency according to claim 14, wherein the coating is a multilayered, silver containing coating.

16. The transparency according to claim 14, wherein the coating is a first electrically conductive coating on the inner major surface of the second glass sheet and further comprising a second electrically conductive coating positioned along at least a central portion of the inner major surface of the second glass sheet and electrically isolated from the first coating.

17. The transparency according to claim 11, further comprising first and second connectors electrically connected to the first and second leads, respectively, to provide external electrical access to the leads, bus bars and coating.

18. The transparency according to claim 11, wherein the heating arrangement extends along the inner major surface of the second glass sheet.

19. The transparency according to claim 11, wherein the transparency is a windshield.

20. The transparency according to claim 11, wherein the plurality of bus bars include at least three spaced bus bars defined as a first bus bar, a second bus bar and a third bus bar, with the second bus bar positioned between the first and third bus bars so as to define a first discrete heatable area between and electrically connecting the first and second bus bars and a second discrete heatable area between and electrically connecting the second and third bus bars, and further wherein the first lead electrically interconnects the first and third bus bars, and the second lead is electrically connected to the second bus bar such that moving current through the first and second leads and the bus bars moves current across the first and second discrete areas to heat the discrete areas and the portion of the first lead overlays the portion of the second lead adjacent the connected side of the conductive member.

21. A method of making a transparency having a heatable wiper rest area comprising:

providing a rigid transparent sheet having major surface;

applying an opaque band on marginal edge portions of the major surface of the sheet along at least a portion of a selected edge of the sheet at an expected wiper rest area;

applying an electrically conductive member having a first side and an opposite second side on the opaque band along at least a portion of the selected edge of the sheet with the first side of the conductive member adjacent to, and spaced from, the selected edge of the sheet and in a fixed relationship to the expected wiper rest area;

positioning a plurality of bus bars in spaced relationship to one another along, and in electrical contact with the conductive member, wherein the plurality of bus bars divides the electrically conductive member into a plurality of adjacent discrete heatable areas;

positioning a first lead on the opaque band and along the first side of the coating to electrically interconnect ones of the plurality of bus bars having two adjacent discrete heatable areas separated by one of the plurality of bus bars not connected to the first lead;

positioning a second lead along the opaque band and along the first side of the coating to electrically interconnect ones of the plurality of bus bars having two adjacent discrete heatable areas and one of the plurality of bus bars connected to the first lead, or to electrically connect one of the plurality of bus bars between a pair of adjacent ones of the plurality of bus bars connected to the first lead, such that moving current through the first and second leads, and the bus bars moves current across the discrete areas to heat the discrete areas, wherein a portion of the first lead and a portion of the second lead overlay each other; and electrically insulating the portion of the first lead from the portion of the second lead that overlay each other.

22. The method according to claim 21, wherein the sheet is a first glass sheet, and further including securing a second glass sheet to the first glass sheet with a plastic interlayer positioned between the first glass sheet and the second glass sheet with the opaque band and the conductive member between the sheets.

23. The method according to claim 22 wherein the transparency is a laminated transparency for a vehicle, the conductive member is a first conductive member, and the major surface of the first sheet faces a major surface of the second sheet, and further including the step of applying a second conductive member to a center portion of the inner surface of at least one of the first and second sheets with the first and second conductive members electrically isolated from one another.

24. The transparency according to claim 1 wherein the sheet is a glass sheet, and the major surface of the sheet is a first major surface and further including an opposite second major surface with the heatable wiper rest area on the second major surface of the sheet, the opaque band is on the first major surface of the sheet in facing relationship to the heatable wiper rest area and the heating arrangement is in facing relationship to the opaque band with the opaque band between the heatable wiper rest area and the heating arrangement.

25. The transparency according to claim 1 wherein the conductive member has a four sides and the ends of the bus bar extend beyond adjacent side of the conductive member.

26. The transparency according to claim 2 wherein the portion of the first lead overlays the portion of the second lead at a position between the selected edge and the first side of the conductive member.

27. The transparency according to claim 14, wherein the coating is a first electrically conductive coating and further comprising a second electrically conductive coating, the first and second coatings are between the first and second sheets and electrically isolated from one another.

28. The transparency according to claim 11 wherein the conductive member is on the inner surface of the first sheet and the portion of the first lead overlays the portion of the second lead at a position between the selected edge of the first glass sheet and the first side of the conductive member.

29. The transparency according to claim 1 wherein the plurality of bus bars further comprises a fourth bus bar and a fifth bus bar each positioned on, and in electrical contact, with the conductive member with the fourth bus bar adjacent to and spaced from the third bus bar and the fifth bus bar adjacent to and spaced from the fourth bus bar; the portions of the conductive member between the third and fourth bus bar provide a third discrete heatable area and the portion of the conductive member between the fourth and fifth bus bars provide a fourth discrete heatable area; the first lead interconnects the first, third and fifth bus bars, and the second lead interconnects the second and fourth bus bars, and moving current through the first and second leads moves current across the first, second, third and fourth discrete areas, and further wherein the overlay is a first overlay and further comprising a second overlay spaced from the first overlay wherein the first lead and second lead are electrically isolated from one another at the second overlay.

* * * * *